United States Patent [19]

Cruise et al.

[11] Patent Number: 5,354,216
[45] Date of Patent: Oct. 11, 1994

[54] MOUNTING SYSTEM FOR ELECTRICAL CONNECTORS

[75] Inventors: Tom Cruise, Batavia, Ill.; Matthew Whilhite, Dooravoyle, Ireland

[73] Assignee: Molex Incorporated, Lisle, Ill.

[21] Appl. No.: 191,447

[22] Filed: Feb. 3, 1994

Related U.S. Application Data

[63] Continuation of Ser. No. 71,549, Jun. 4, 1993, abandoned.

[30] Foreign Application Priority Data

Aug. 19, 1992 [IE] Ireland .................................. S922598

[51] Int. Cl.⁵ .............................................. H01R 13/74
[52] U.S. Cl. .............................................. 439/553
[58] Field of Search ..................... 248/222.1, 222.2; 439/553, 554, 557, 558

[56] References Cited

U.S. PATENT DOCUMENTS

| | | | |
|---|---|---|---|
| 4,717,358 | 1/1988 | Chaundy | 439/557 |
| 4,883,432 | 11/1989 | Reed | 439/553 |
| 4,909,757 | 3/1990 | Reed | 439/532 |

*Primary Examiner*—Gary F. Paumen
*Attorney, Agent, or Firm*—Stephen Z. Weiss

[57] ABSTRACT

A mounting system is provided for readily mounting an electrical connector in an opening in a panel for interconnecting an electrical device on one side of the panel with an electrical component on the other side of the panel. A complementary interengaging pivot arrangement is provided between a nose of the connector and the panel, near the opening in the panel, whereby the connector can be rotated to an operative position in the opening. Complementary interengaging latches are provided between the connector and the panel, near the opening and remote from the pivot means, for holding the connector in its operative position. Interengaging stops are provided for preventing disengagement of the pivot arrangement when the connector is in its operative position.

4 Claims, 3 Drawing Sheets

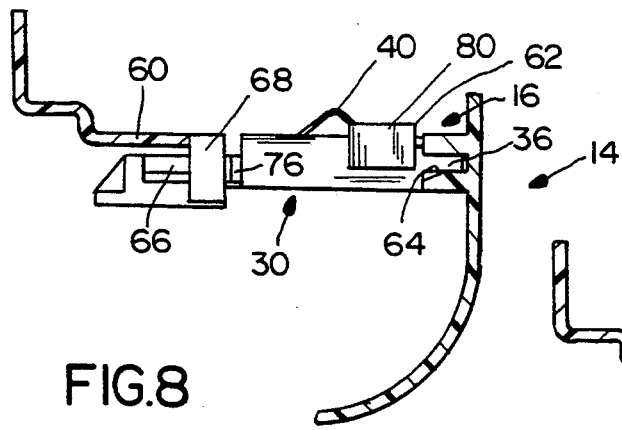
FIG.8
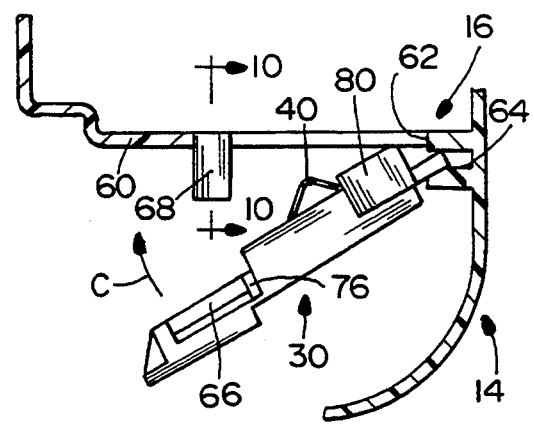
FIG.9
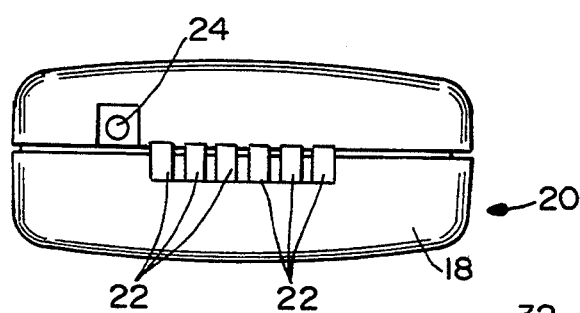
FIG.2
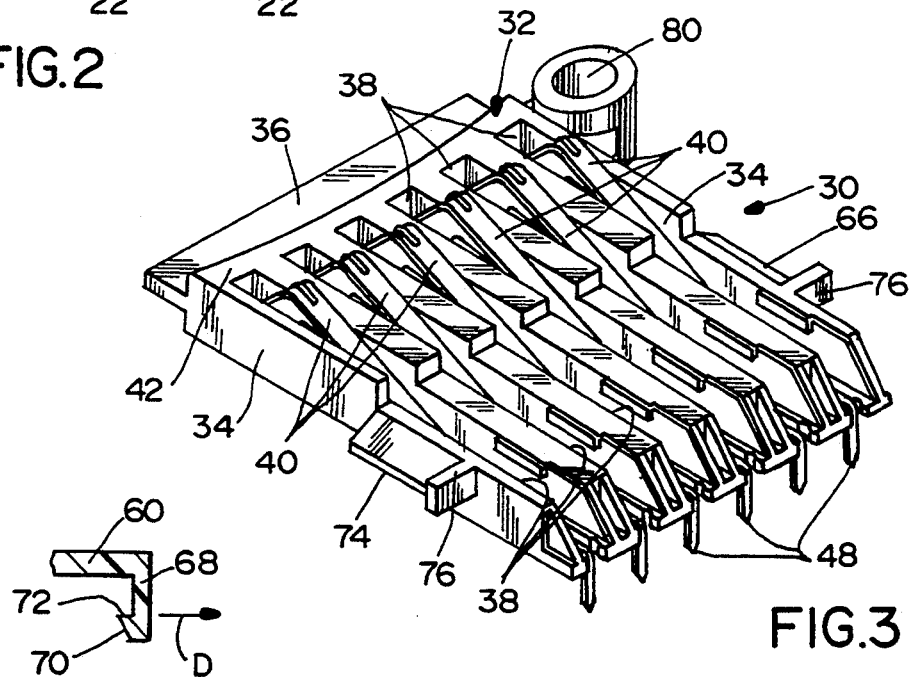
FIG.3
FIG.10

MOUNTING SYSTEM FOR ELECTRICAL CONNECTORS

This is a continuation of copending application Ser. No. 08/071,549, filed on Jun. 4, 1993, now abandoned.

FIELD OF THE INVENTION

This invention generally relates to the art of electrical connectors and, particularly, to a mounting system for readily mounting an electrical connector in an opening in a panel, such as in a base unit for a mobile telephone to interconnect terminals on a handset to a printed circuit board in the base unit.

BACKGROUND OF THE INVENTION

It is a continuing problem to provide systems for securely mounting electrical connectors on support structures, particularly in environments where the connectors must be replaced or interchanged. This is particularly true in situations where the connector is mounted to a support panel, such as in an opening in the panel, to interconnect an electrical device on one side of the panel with an electrical component on the other side of the panel.

For instance, in mobile telephone systems, a base unit is provided with a receptacle for receiving a telephone handset. The handset is battery powered and terminals are exposed on the handset, usually at one end thereof, so that the handset can be mounted on the base unit for recharging or for data retrieval purposes. The exposed terminals at the one end of the handset, when positioned in the receptacle, engage terminals of an electrical connector. The connector terminals interconnect the handset terminals with an electrical component, such as a printed circuit board, within the base unit.

In various electronic devices, such as the mobile telephone system described above, the electrical connector often is subjected to considerable abuse, such as repeated repositioning of the telephone handset into the receptacle of the base unit. Consequently, the electrical connector becomes damaged and/or worn and must be replaced more often than electrical connectors in many other environments. Heretofore, such electrical connectors have been mounted by separate fasteners, and tools, sometimes special tools, are required to install, remove or interchange the connectors. This is time consuming, adds to the cost of manufacturing and assembling the device, and is not consumer oriented.

Therefore, there is a need for a very simple mounting system for electrical connectors of the character described, particularly a mounting system which has latches requiring no extraneous components, and wherein the latches secure the connector in all directions.

SUMMARY OF THE INVENTION

An object, therefore, of the invention is to provide a new and improved mounting system for readily mounting an electrical connector to a support structure, such as a panel or the like.

As disclosed herein, the mounting system mounts the connector in an opening in a panel for interconnecting an electrical device (such as a telephone handset as described above) on one side of the panel with an electrical component (such as a printed circuit board) on the other side of the panel.

The mounting system, generally, includes complementary interengaging pivot means between a nose of the connector and the panel near the opening therein. The pivot means can be interengaged, and the connector can be rotated to an operative position in the opening in the panel.

The invention contemplates that complementary interengaging latch means be provided between the connector and the panel near the opening, remote from the pivot means, for holding the connector in its operative position. The latch means include abutment means for preventing disengagement of the pivot means.

In the exemplary embodiment of the invention, the electrical connector includes a dielectric housing having the pivot nose at one end thereof, and the latch means include a latch on at least one side of the housing. The latch is provided in the form of a cam latch member which is snap-lock received by a resilient latch arm on the panel near the opening. The abutment means is provided in the form of a stop surface on the connector for engaging the resilient latch arm to prevent the connector from moving away from and disengaging the pivot means. The pivot means is provided in the form of a tongue at the nose of the connector insertable into a slot in the panel. Therefore, the latch means not only holds the connector in its operative position in the panel opening, but the latch means is configured to prevent disengagement of the pivot means.

Another feature of the invention includes the provision of a socket integral with one side of the electrical connector for receiving a coaxial cable component, such as from a handset of a mobile telephone system.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is a bottom plan view of the telephone handset, showing the terminals at the bottom thereof;

FIG. 3 is a perspective view of an electrical connector readily mountable in the base unit of the mobile telephone system, and incorporating the concepts of the invention;

FIG. 8 is a fragmented vertical section taken generally along line 8—8 of FIG. 1;

FIG. 9 is a vertical section similar to that of FIG. 8, showing the electrical connector in a sequential position of mounting the connector, with the pivot means engaged, and before the connector is rotated to its operative position shown in FIG. 8; and FIG. 10 is fragmented vertical section taken generally along line 10—10 of FIG. 9.

DETAILED DESCRIPTION OF THE PREFERRED EMBODIMENT

Figure 1:
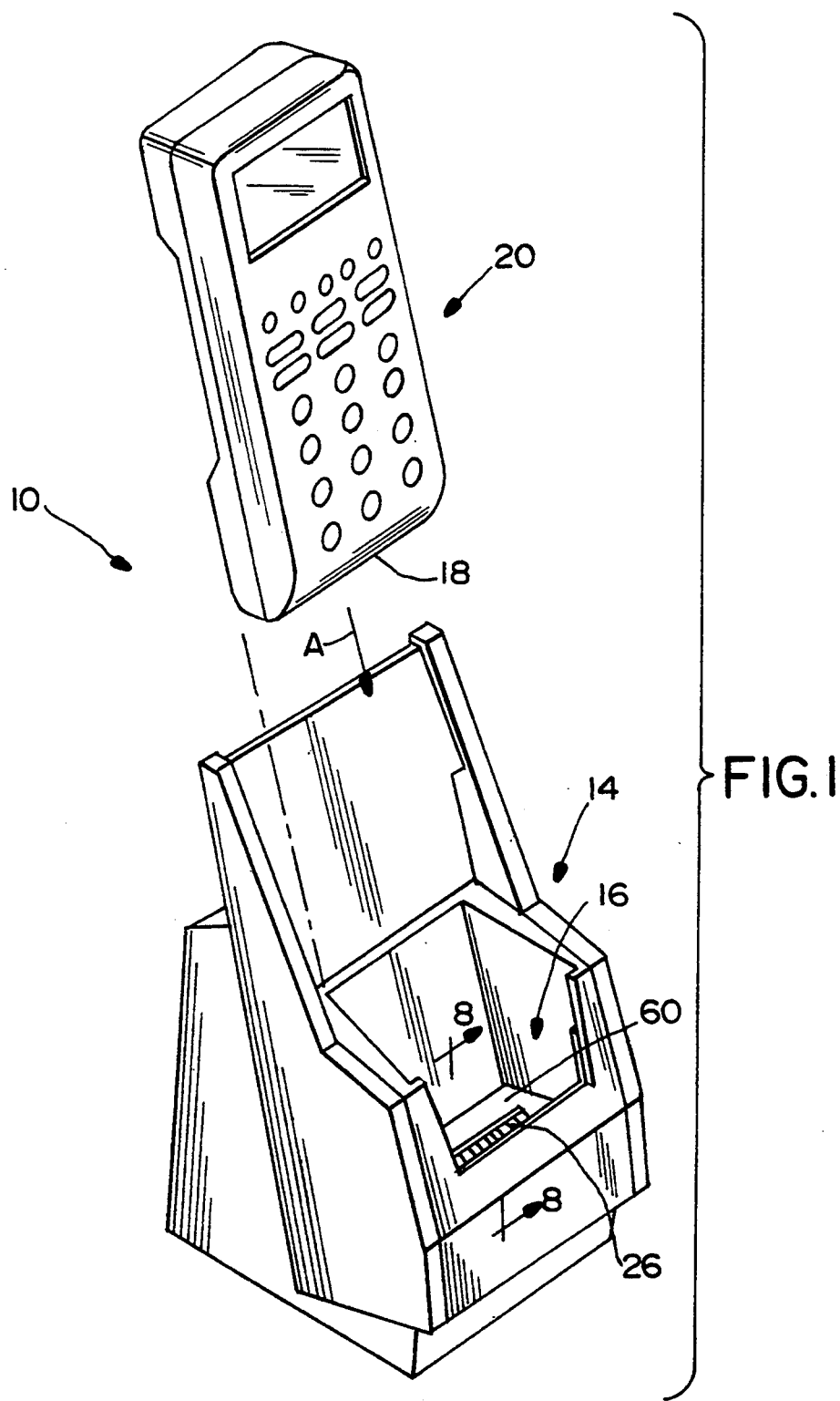
FIG. 1 is a perspective view of a mobile telephone assembly, incorporating the electrical connector mounting system of the invention.
Figure 4:
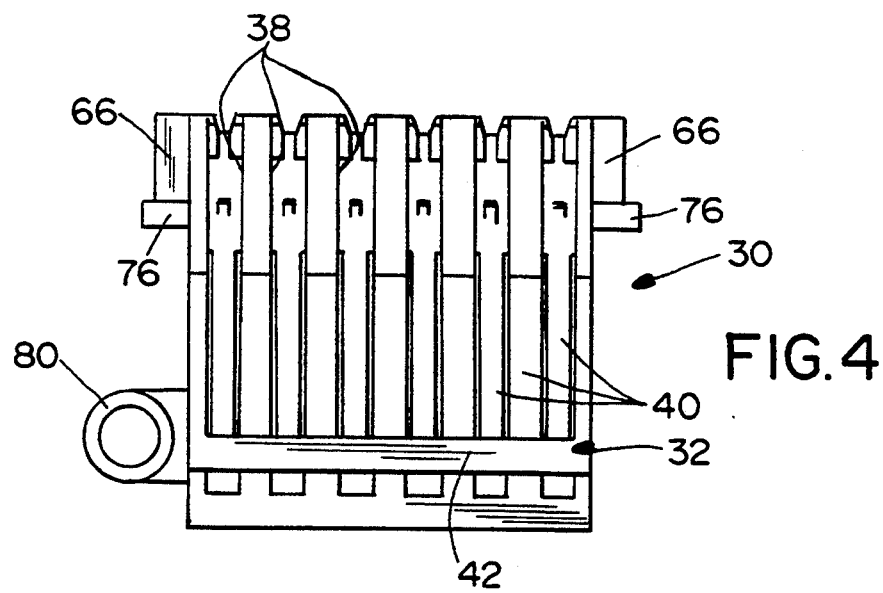
FIG. 4 is a top plan view of the electrical connector.
Figure 5:
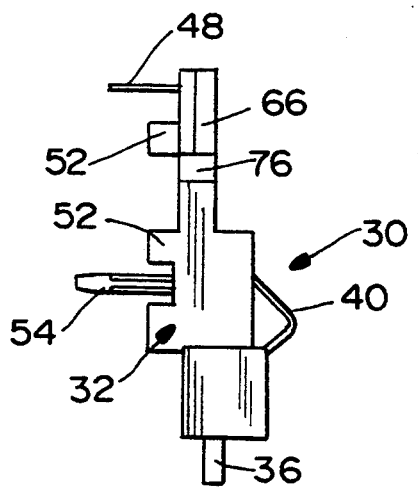
FIG. 5 is a side elevational view of the electrical connector, as looking at the left-hand side of FIG. 4.

Referring to the drawings in greater detail, and first to FIGS. 1 and 2, although the electrical connector mounting system of the invention has a wide variety of applications, the invention is illustrated herein as embodied in a mobile telephone system, generally designated 12 (FIG. 1). The mobile telephone system includes a base unit, generally designated 14, having a socket or receptacle, generally designated 16, for receiving one end 18 of a telephone handset, generally designated 20. As seen in FIG. 2, the one end or bottom 18 of handset 20 includes a plurality of terminals 22 which are exteriorly exposed. A coaxial cable plug 24 also projects from the bottom end of the handset.

Referring back to FIG. 1, the bottom end of telephone handset 20 is inserted into receptacle 16 of base unit 14 in the direction of arrow "A". When the handset is fully seated in the receptacle, the exposed terminals 22 at the bottom of the handset engage terminal means, generally designated 26, at the bottom of the receptacle. As will be more clearly described hereinafter, terminal means 26 are part of the readily mountable electrical connector of the invention, the connector being effective to interconnect the terminals of the handset with an electrical component, such as a printed circuit board, within base unit 14 for recharging the handset or for data retrieval purposes.

Referring to FIGS. 3-7, the mounting system of the invention is designed, generally, for readily mounting an electrical connector, generally designated 30, in an opening in a panel for interconnecting an electrical device (such as telephone handset 20) on one side of the panel with an electrical component (such as a printed circuit board within base unit 14) on the other side of the panel.

More particularly, electrical connector 30 includes a unitarily molded dielectric housing, generally designated 30, which includes a pair of side walls 34 and a front or forward nose defined by a flange-like tongue or nose 36. A plurality of slots or grooves 38 are formed in housing 32, generally parallel to and spaced between side walls 34, for receiving a plurality of terminals which have spring contact arms 40 projecting upwardly of a top surface 42 of housing 32. These upwardly projecting spring contact arms 40 correspond to the terminal means 26 visible in FIG. 1 at the bottom of receptacle 16 of base unit 14. These spring contact arms are engageable with terminals 22 (FIG. 2) exposed at the bottom end 18 of handset 20 when the handset is fully seated in receptacle 16 of the base unit.

Figure 7:
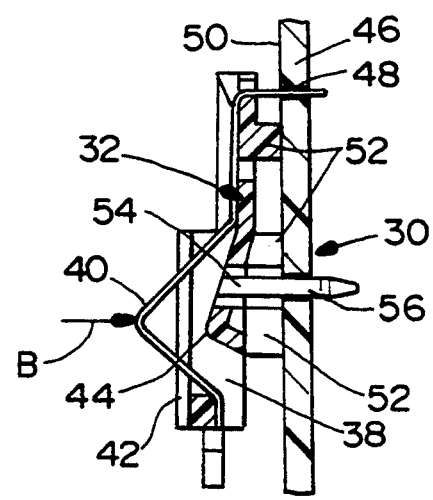
FIG. 7 is a vertical section taken generally along line 7—7 of FIG. 6.
Figure 6:
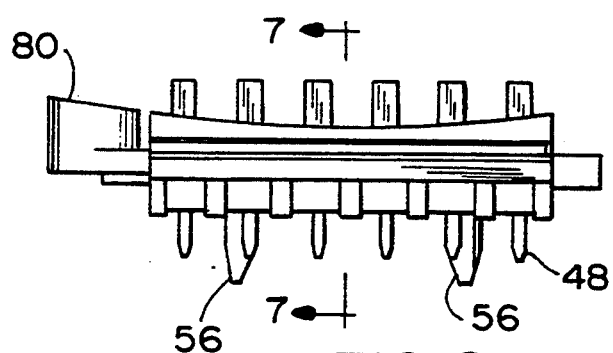
FIG. 6 is an end elevational view of the electrical connector, as looking at the front of FIG. 4.

FIG. 7 illustrates one of the terminals of electrical connector 30 to best show how the respective spring contact arm 40 projects upwardly of top surface 42 of connector 30. The connector includes an interior, inclined ramp surface 44 to prevent over-stressing of spring contact arm 40. When telephone handset 20 is inserted into receptacle 16 of base unit 14 in the direction of arrow "A" (FIG. 1), a respective one of terminals 22 (FIG. 2) of the handset will engage spring contact arm 40 and bias the spring contact arm downwardly in the direction of arrow "B" (FIG. 7).

As stated above, electrical connector 30 is provided for interconnecting an electrical device (such as handset 20) with an electrical component. Consequently, a printed circuit board 46 has been illustrated in FIG. 7. Each terminal within electrical connector 30 includes a solder tail 48 for insertion into an appropriate hole in the printed circuit board for soldering to a circuit trace on a top surface 50 of the board or in the hole of the board. Housing 32 of connector 30 includes a plurality of integrally molded standoffs 52 for engaging the top surface of the board, along with a plurality of mounting pegs 54 for insertion into mounting holes 56 in the board.

Referring to FIGS. 8-10 in conjunction with FIG. 3, the mounting system of the invention now will be described. With FIG. 8 being a fragmented section taken generally along 8—8 of FIG. 1, it can be seen that the bottom of receptacle 16 of base unit 14 is defined by a wall or panel 60 having an opening 62 therein. Therefore, electrical connector 30 is mountable in the opening so that spring contact arms 40 of the connector terminals are exposed at the bottom of receptacle 16 for engaging terminals 22 at the bottom of handset 20 when the handset is inserted into the receptacle.

Generally, complementary interengaging pivot means are provided between electrical connector 30 and panel 60, near opening 62, whereby the pivot means can be interengaged and the connector can be rotated to an operative position in opening 62 in the panel. More particularly, a pivot slot or groove 64 is formed in the base unit for receiving flange or nose 36 at the forward end of electrical connector 30. FIG. 9 shows how the nose initially is inserted into the pivot groove, whereupon connector 30 can be rotated in the direction of arrow "C" to an operative position shown in FIG. 8, with the connector mounted in or closing opening 62.

Generally, complementary interengaging latch means are provided between electrical connector 30 and panel 60, near opening 62, remote from the pivot means of pivot nose 36 and pivot slot 64, for holding the connector in its operative position illustrated in FIG. 8. More particularly, as might best be seen in FIG. 3, a pair of cam latch members 66 project outwardly from side walls 34 of connector housing 32. A pair of resilient latch arms 68 (FIGS. 8-10) depend from the underside of panel 60 on opposite sides of opening 62 for interengagement with cam latch members 66 on opposite sides of connector 30. As can be seen best in FIG. 10, resilient latch arms 68 have cam surfaces 70 which lead to locking shoulders 72 to define a hook-like configuration. Therefore, when electrical connector 30 is rotated in the direction of arrow "C" (FIG. 9), to its operative position (FIG. 8), cam surfaces 70 engage cam latch members 66 to bias the resilient latch arms 68 outwardly in the direction of arrow "D" (FIG. 10), whereupon locking shoulders 72 snap-lock beneath bottom surfaces 74 (FIG. 3) of cam latch members 66 to lock the connector in its operative position against rotational movement opposite that of arrow "C" (FIG. 9). When it is desirable to remove and/or replace electrical connector 30, resilient latch arms 68 simply are spread outwardly in the direction of arrow "D" (FIG. 10), and the electrical connector readily can be rotated out of opening 62 and be removed and/or replaced.

The latch means of the invention further includes abutment means for preventing disengagement of pivot nose 36 from within pivot slot 64. More particularly, as seen best in FIG. 3, stop flanges 76 are molded integrally with and project outwardly from side walls 34 of connector housing 32. It can be seen that the stop flanges are located immediately in front of cam latch members 66. This also can be seen in FIGS. 8 and 9. When connector 30 is in its operative position of FIG. 8, these stop flanges also are located immediately forwardly of resilient latch arms 68 depending from the underside of panel 60. When pivot nose 36 is positioned within pivot slot 64, stop flanges 76 provide abutment means for engaging resilient latch arms 68 to prevent the connector from moving away from and disengaging the pivot tongue and pivot slot. Therefore, the mounting system of the invention provides latch means for holding the electrical connector in its operative position with the pivot means interconnected, and the latch means further includes abutment means for preventing disengagement of the pivot means.

Lastly, electrical connector housing 32 includes an integral socket 80 projecting outwardly from one side thereof for receiving coaxial cable plug 24 (FIG. 2) at the bottom of handset 20.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a mounting system for readily mounting an electrical connector in an opening in a panel for interconnecting an electrical component on one side of the panel with an electrical component on the other side of the panel, said connector including a dielectric housing having a nose at one end with side walls extending therefrom, said mounting system including complementary interengaging pivot means between the nose of the connector and the panel near the opening whereby the pivot means can be interengaged and the connector can be rotated to an operative position in the opening in the panel, wherein the improvement comprises complementary interengaging latch means integral with the connector and the opening on at least one side of the connector and on at least one portion of the opening between the connector and the panel near the opening remote from the pivot means for holding the connector in its operative position, said interengaging latch means including a cam latch member extending on and parallel to each said connector housing side wall and a resilient latch arm on the panel extending perpendicular from the panel near the opening for snap lock receiving the cam latch member, and abutment means integral with the cam latch members projecting outwardly away from the connector housing sidewalls adapted to contact a side of said resilient latch arm for preventing disengagement of said connector from said pivot means in a direction parallel to the plane of the panel.

2. In a mounting system as set forth in claim 1, wherein said abutment means comprise a stop surface on the connector for engaging the resilient latch arm to prevent the connector from moving away from and disengaging the pivot means.

3. In a mounting system as set forth in claim 1, wherein said complementary interengaging pivot means include a tongue at the nose of the connector insertable into a slot in the panel.

4. In a mounting system as set forth in claim 1, wherein said electrical connector includes a unitary housing having an integral socket on one side thereof for receiving a coaxial cable component.

* * * * *